Nov. 11, 1947.  S. V. E. TAYLOR  2,430,836
PACKING STRUCTURE
Filed Oct. 29, 1943

*INVENTOR.*
SCOTT V. E. TAYLOR
BY
*ATTORNEY*

Patented Nov. 11, 1947

2,430,836

UNITED STATES PATENT OFFICE 2,430,836

PACKING STRUCTURE

Scott V. E. Taylor, Cleveland, Ohio, assignor to The Cleveland Pneumatic Tool Company, Cleveland, Ohio, a corporation of Ohio Application October 29, 1943, Serial No. 508,139

1 Claim. (Cl. 286—26)

The present invention relates broadly to packings of the type adapted to expand radially internally and externally for affording a fluid tight joint between two spaced telescoping elements.

The primary object of the invention is to provide a new and improved packing particularly adaptable for use in shock absorbing struts for airplanes for effecting a fluid tight joint between the telescoping cylinders forming a part of such struts.

A further object of the invention is to provide a packing ring preferably formed of synthetic rubber or other compound molded about a metal insert, the metal insert acting as a spring to expand the lips of the packing radially to effect a fluid tight joint when used with spaced telescoping elements.

Other objects and advantages more or less ancillary to the foregoing reside in the specific construction and aggroupment of the elements peculiar to this structure, as will become apparent from a more complete examination of this specification.

In the drawing which illustrates the invention:

Figure 1:
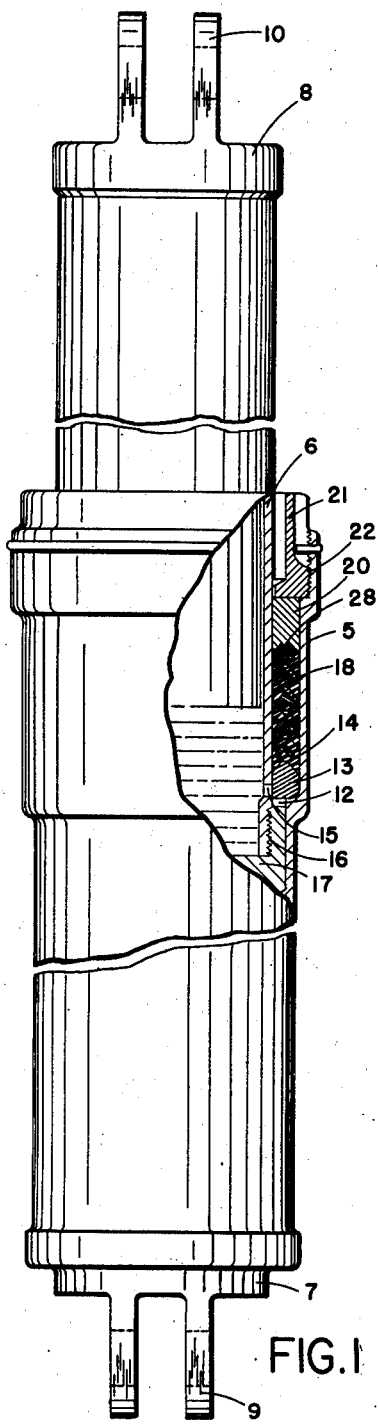
Fig. 1 is a side elevational view partly in section of a shock absorbing strut embodying the invention.
Figure 2:
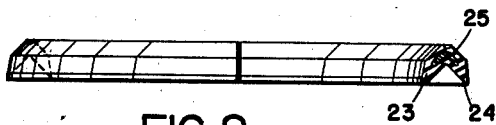
Fig. 2 is an elevational view partly in section of the improved packing structure.
Figure 3:
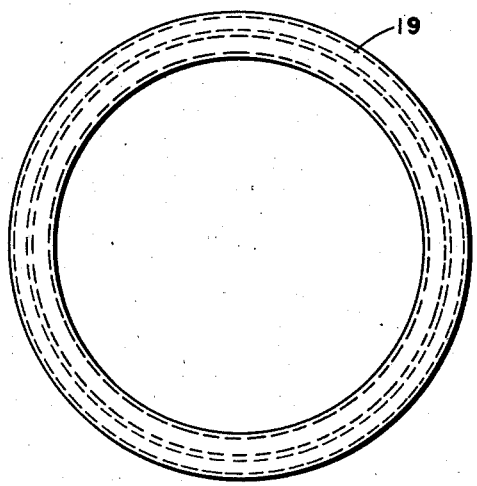
Fig. 3 is a top plan view thereof.

Referring to the drawing for a more detailed description thereof, 5 and 6 represent the outer and inner cylinders, respectively, of a shock absorbing strut, the remote ends of the cylinder being closed by caps 7 and 8, through which caps the shock absorbing strut may be attached to the parts of an airplane whose relative movements are to be cushioned by the end members 9 and 10. On the inner end of the inner cylinder 6 is mounted a piston partially shown in Fig. 1 of the drawing and identified by the reference numeral 17 which piston has slidable engagement with the inner wall of the outer cylinder 5. The piston 17 is preferably threadedly attached to the inner end of the inner cylinder 6 as indicated at 16. In practice, the piston 17 is formed with a central orifice through which is free to slide a metering pin carried by the closed end of the outer cylinder 5. The central orifice and metering pin have not been shown since they form no part of the present invention. The diameter of the inner cylinder 6 is materially smaller than that of the outer cylinder 5, thus normally forming between the two cylinders an annular chamber 12 closed at one end by the piston 17 and at the other end by a ring or retainer 13 resting on the bottom of a counterbore 14 forming the inner end of the outer cylinder. The annular chamber 12 is capable of communication with the interior of the inner cylinder 6 through one or more ports 15 extending through the inner cylinder adjacent the piston 17.

Resting on the retainer 13 within the counterbore 14, there is a packing structure 18 comprising a series of superposed rings 19, to be hereinafter more fully described, said packing structure being held against endwise movement by a bushing 20 and nut 21, the latter being screwthreadedly attached within the upper end of the counterbore as indicated at 22. The retainer 13 and bushing 20 are adequately machined to form sliding bearings for the inner cylinder.

Stored within the cylinder 6, there is a liquid introduced therein through a filler plug, not shown, screwed within said cylinder adjacent its upper end. The level of the liquid within the inner cylinder is always above the piston 17, while the inner cylinder also contains compressed air active on the liquid and admitted into the cylinder in a manner well known in this art.

Figure 4:
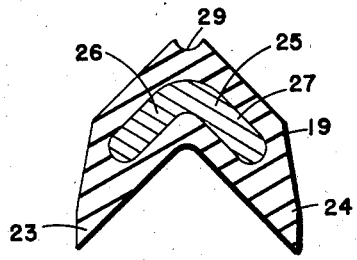
Fig. 4 is an enlarged section of the packing structure and illustrating the arrangement of the metal insert within the ring.

Referring now more particularly to the invention, the packing structure 18 is formed of a plurality of rings 19 disposed in superposed relation, said rings having diverging lips 23 and 24 having wiping contact with the outer wall of the inner cylinder 6 and the inner wall of the counterbore 14, respectively. The rings 19 are preferably formed of a synthetic rubber or other compound molded about an annular metal insert 25. The metal insert 25 is formed with downwardly diverging arms 26 and 27 throughout its periphery which extend partially into the lips 23 and 24, as more particularly shown in Fig. 4 of the drawing. As is to be understood, the inserts 25 are formed of a material having a certain degree of resiliency which would cause the ring, and particularly the lips thereof, to have pressure contact with the walls of the telescoping cylinders. Prior to molding, the metal insert has its entire surface brass plated to assure proper adhesion of the rubber thereto.

The retainer 13 is shaped so as to accurately receive the flared ends or lips of the lowermost ring when installing the packing structure between the telescoping cylinders while the bushing 20 is preferably formed with a tongue 28 adapted to be received within a groove 29 formed in the ring 19. After positioning the retainer 13, superposed rings 19 and bushing 20 within the counterbore 14 between the cylinders 5 and 6, the nut 21 is screwed into the upper end of the counterbore 14 compressing the rings 19 and causing their lips 23 and 24 through the action of the metal inserts 25 to snugly engage the outer wall of the inner cylinder 6 and the inner wall of the outer cylinder 5. In other words, the insert 25 acts more or less as a spring to open up the flared lips 23 and 24 causing said lips to have pressure engagement with the walls of the telescoping elements. It has been found in actual practice that the metal insert will also aid in eliminating shrinking and swelling of the synthetic rubber by reducing the quantity of synthetic material used.

Although the foregoing description is necessarily of a detailed character, in order to completely set forth the invention, it is to be understood that the specific terminology is not intended to be restrictive or confining, and it is to be further understood that various rearrangements of parts and modifications of structural detail may be resorted to without departing from the scope or spirit of the invention as herein claimed.

I claim:

A packing structure for use between two cylindrical telescoping elements, comprising a plurality of nested annular rubber rings generally V shaped in cross-section interposed between said telescoping elements, each of said rings on its convex side having an annular recess at the apex of the V surface, an annular retainer shaped in cross-section to fit within the concave side of one end ring, and a bushing shaped in cross-section to fit the convex side of the other end ring, said bushing having an annular tongue fitting within the annular recess of the last named ring.

SCOTT V. E. TAYLOR.

REFERENCES CITED

The following references are of record in the file of this patent:

UNITED STATES PATENTS

| Number | Name | Date |
|---|---|---|
| 1,924,555 | Hubbard | Aug. 29, 1933 |
| 1,969,008 | Hubbard | Aug. 7, 1934 |
| 2,244,135 | Wallace | June 3, 1941 |
| 2,284,340 | Nuckles | May 26, 1942 |
| 2,240,805 | Semon | May 6, 1941 |

FOREIGN PATENTS

| Number | Country | Date |
|---|---|---|
| 40,899 | Germany | 1887 |
| 478,136 | Great Britain | 1938 |